Feb. 8, 1938.  J. C. BUCHANAN  2,107,562
REFRIGERATING APPARATUS
Filed May 21, 1935  2 Sheets-Sheet 1
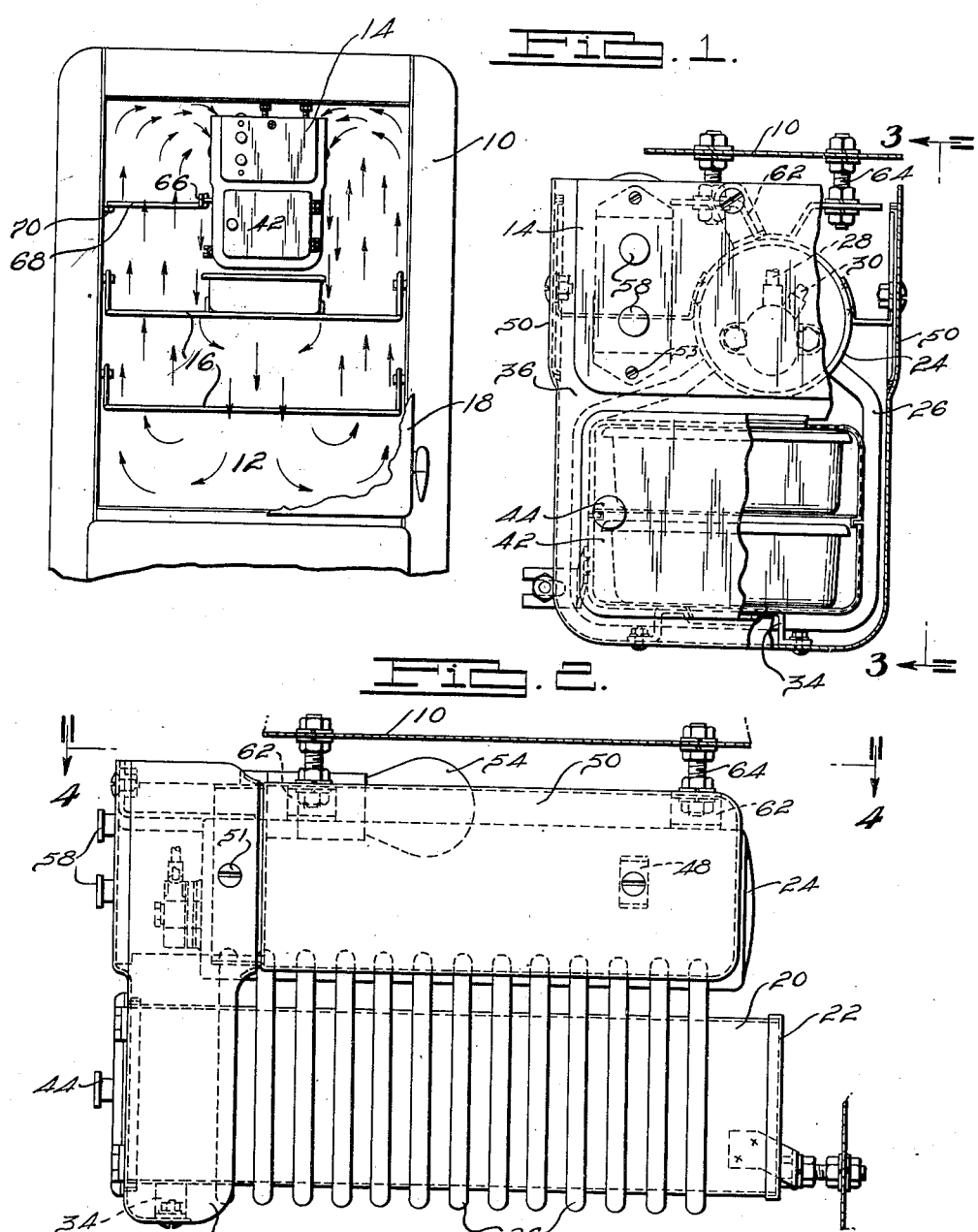
INVENTOR.
John C. Buchanan,
BY
ATTORNEY Feb. 8, 1938. J. C. BUCHANAN 2,107,562
REFRIGERATING APPARATUS
Filed May 21, 1935 2 Sheets-Sheet 2

INVENTOR.
John C. Buchanan,
BY
ATTORNEY

Patented Feb. 8, 1938

2,107,562

UNITED STATES PATENT OFFICE 2,107,562

REFRIGERATING APPARATUS

John C. Buchanan, Detroit, Mich., assignor to Borg-Warner Corporation, a corporation of Illinois Application May 21, 1935, Serial No. 22,626

6 Claims. (Cl. 62—89)

This invention relates to refrigerating apparatus, and a principal object of the invention is to provide in refrigerating apparatus an improved form of evaporator construction and a novel arrangement of an evaporator and associated structure within the food storage compartment of a refrigerator.

Another object of the invention is to provide an improved form of evaporator structure which is more efficient in operation, which is so disposed within the food storage compartment of a refrigerator to more efficiently utilize the available space within the food storage compartment, and which evaporator is more convenient in use and more pleasing in appearance.

In the embodiment of the invention selected for purposes of illustration, a food storage compartment of a refrigerator is provided with an evaporator suspended from the upper wall of the food storage compartment and spaced from the side walls so as to provide on one side thereof a space within which bottles may be stored in an upright position and so as to assist the natural circulation of air within the food storage compartment. The evaporator structure comprises a sleeve adapted for the reception of one or more trays, a refrigerant chamber disposed above the tray and provided with a plurality of looped conduits encircling the sleeve. A shield is connected to the refrigerant chamber and to the sleeve so as to conceal the front portions thereof and is provided with an opening, through which access may be had to the sleeve, and a door for closing the opening. The evaporator structure also provides for the convenient disposition of a control switch which is carried by the shield at one side of the refrigerant chamber, and a light which operates to illuminate the interior of the food storage compartment when the door thereof is open. The refrigerant chamber of the evaporator is adapted to be supplied with liquid refrigerant from a condensing unit, the operation of which is controlled by a control switch which operates responsive to changes in conditions within the food storage compartment or the evaporator and the admission of which liquid refrigerant into the refrigerant chamber is controlled such as by a float control valve or an expansion valve.

For a better understanding of the invention, reference may be had to the following specification, taken in conjunction with the accompanying drawings, of which there are two sheets and in which:

Fig. 1 is an elevational view of the food storage compartment of a refrigerator, with the door broken away, in which the invention is embodied;

Fig. 2 is an elevational view, partially broken away, of the evaporator structure;

Fig. 3 is a side elevational view of the evaporator structure taken on the line 3—3 of Fig. 2;

Figure 4:
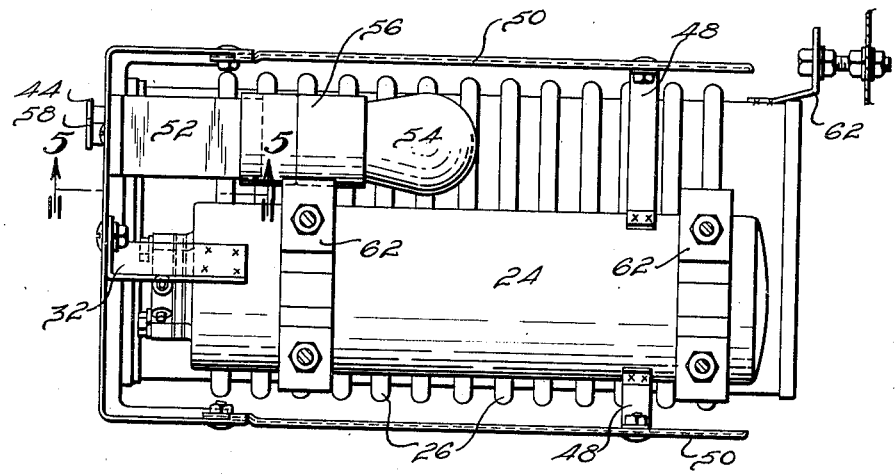
Fig. 4 is a plan view of the evaporator structure taken in a plane on the line 4—4 of Fig. 3.
Figure 5:
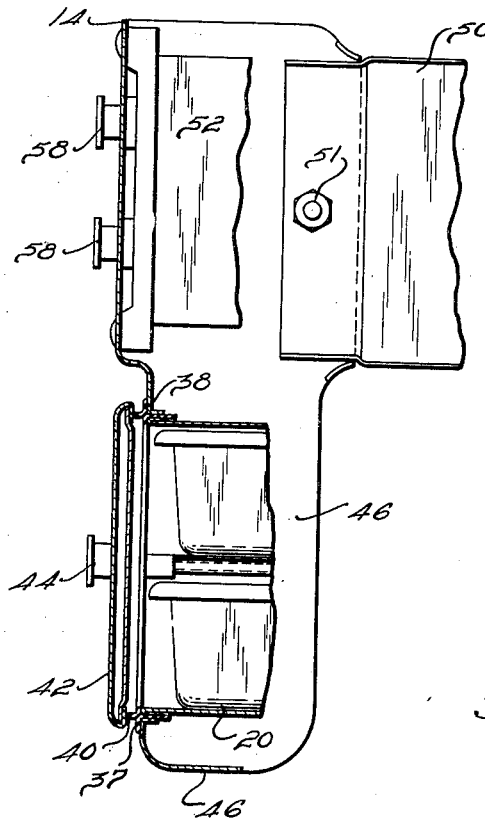
Fig. 5 is a sectional view along the line 5—5 of Fig. 4 and illustrating certain details of construction.

In Fig. 1 there is illustrated a portion of a refrigerator 10 having a food storage compartment 12, in which an evaporator structure 14 is disposed, as well as a plurality of shelves 16, and for which food storage compartment 12 a door 18 is provided for closing the same.

The evaporator structure comprises a tray or sleeve member 20, closed at the rear thereof by a wall 22, a refrigerant chamber 24, a plurality of tubes or loops 26 encircling the sleeve or tray member 20 and providing a plurality of passageways about the same and which passageways are in communication with the interior of the refrigerant chamber 24. The loops or tubes 26 are suitably secured such as by brazing or welding to the body of the refrigerant chamber 24 and support the sleeve or tray member 20 therefrom.

The refrigerant chamber 24 and the loops or tubes 26 are adapted to contain a liquid refrigerant which is supplied thereto by a condensing unit to which the conduits 28 and 30 lead, for the purpose of conducting liquid refrigerant to the refrigerant chamber 24 and gaseous refrigerant from the chamber 24. The mechanism which controls the supply of liquid refrigerant to the refrigerant chamber 24 forms no part of this invention and may be of the type illustrated and claimed in the application of Edward M. May, Serial No. 728,242, filed May 31, 1934.

The refrigerant chamber 24 and sleeve 20 are provided with brackets 32 and 34, respectively, by means of which a shield 36 is secured thereto for the purpose of concealing the forward portions of the refrigerant chamber 24, the sleeve 20 and the conduit connections 28 and 30. The shield 36 is bolted to the brackets 32 and 34. The shield 36 is provided with an opening opposite the sleeve 20 and through which opening access may be had to the interior of the sleeve 20 for the purpose of inserting and removing trays from the sleeve 20. A rubber gasket 37 is fitted about the periphery of the open end of the sleeve 20 and is provided with a flange 38 which overlies a portion of the shield 36 about the opening therein and also with a projection 40 which extends forwardly of the front of the face of the shield 36. A door 42 is hingedly secured to the shield 36 and is adapted to cooperate with the flange 40 of the gasket for sealing the entrance to the sleeve 20. The door 42 may be provided with a knob 44 for moving the same.

The shield 36 is provided along the sides and bottom thereof with rearwardly extending flanges 46. The refrigerant chamber 24 is provided with a pair of brackets 48 to each of which there is secured the rear end of a baffle 50, the forward ends of which are secured by a bolt and nut 52 to the flanges 46 of the shield 36. The baffles 50 are adapted to conceal the refrigerant chamber 24 and to direct the currents of air set up within the food storage compartment so that the same pass in close proximity to the refrigerant chamber 24 and the tubes 26. It will be observed that the refrigerant chamber 24 is set to one side of the sleeve 20 so that there is a space provided between the chamber 24 and one of the baffles 50, in which space there is disposed a control switch 52 and a light 54, by means of which light the interior of the food storage compartment may be illuminated. The switch 52 is operable for controlling the operation of the condensing unit responsive to changes in conditions within the evaporator and is suitably connected in any well known manner to the condensing unit for the purpose of controlling the operation thereof. The switch 52 is secured as by a plurality of bolts 53 to the rear face of the shield 36 and is provided with a plurality of control knobs 58 which extend through suitable openings in the shield 36 so that the control switch 52 may be adjusted. The light 54 is mounted in a socket 56 which is carried by the body of the switch 52 and is connected in any well known manner to a source of electric energy.

It will be observed that the light 54 is disposed behind one of the baffles 50 so that the light bulb 54 itself is not visible, but on account of the openings above and below the baffles 50, the light will be reflected to substantially all parts of the food storage compartment 12.

The evaporator structure is provided with a plurality of brackets 62 by means of which the evaporator may be suspended from the upper wall of the food storage compartment, such as by a plurality of bolts 64, and may also be secured to a rear wall of the food storage compartment for the purpose of rigidly holding the evaporator in position. One of the flanges 46 of the shield is provided with a button 66 for supporting one edge of a shelf 68, the other edge of which is supported by a similar button 70 carried by a side wall of the food storage compartment. The space on the opposite side of the evaporator may be utilized for the storage of bottles in an upright position and upon the upper of the shelves 16.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

I claim:

1. In combination with a heat insulated compartment having a door opening, a door for closing said opening, an evaporator structure disposed in said compartment and spaced from the side walls thereof, said evaporator structure comprising a sleeve and a refrigerant chamber, said sleeve and chamber being provided with brackets, said sleeve being open at one end and providing a freezer compartment, a panel secured to said brackets and arranged adjacent the open end of said sleeve and having an opening aligned with the open end of said sleeve, a resilient gasket embracing the periphery of said sleeve at the open end thereof and provided with a flange overlying the front face of said panel and another flange extending substantially forwardly therefrom about the opening therein, and a closure member pivotally carried by said panel and cooperable with said gasket for closing said freezer compartment, said panel being provided with rearwardly extending portions on each side thereof for concealing portions of said evaporator structure.

2. In combination, a heat insulated compartment provided therein with cooling means spaced from the side walls thereof, said cooling means comprising a sleeve open at one end and providing a freezer compartment, a refrigerant header disposed above said sleeve, a panel arranged forwardly of said sleeve and said header and having an opening aligned with the open end of said sleeve, and a closure member carried by said panel and adapted for closing said freezer compartment, said panel being provided upon each side thereof with rearwardly extending integral flanges and being adapted to conceal the front of said header and said sleeve.

3. In combination, a heat insulated compartment provided therein with cooling means spaced from the side walls thereof, said cooling means comprising a sleeve open at one end and providing a freezer compartment, a refrigerant header disposed above said sleeve and substantially coextensive therewith, brackets provided on said sleeve and said header, a panel secured to said brackets and arranged forwardly of said header and said sleeve and having an opening aligned with the open end of said sleeve, and a closure member carried by said panel and adapted for closing said freezer compartment, said panel having secured thereto rearwardly extending shield members upon each side thereof, said shield members being substantially coextensive with said header and disposed laterally thereof.

4. An evaporator assembly adapted to be disposed within a heat insulated compartment comprising a sleeve open at one end thereof and providing a freezer compartment, a refrigerant header disposed above said sleeve and substantially coextensive therewith, loop means secured to said header and disposed about said sleeve for supporting the same from said header, brackets provided on said sleeve and said header, a panel secured to said brackets and arranged forwardly of said sleeve and said header and being provided with an opening aligned with the open end of said sleeve, a closure member carried by said panel and adapted for closing said freezer compartment, a control switch responsive to changes in conditions within said evaporator and carried by said panel and above said sleeve, said switch being operable for controlling the supplying of refrigerant to said cooling means, baffles secured to said panel and extending rearwardly to control circulation of air about the evaporator and to conceal parts of the header and loop means, and brackets secured to said header and providing a means whereby said evaporator assembly may be secured to a wall of said heat insulated compartment.

5. In combination a heat insulated compartment, an evaporator assembly spaced from the sides of said compartment comprising a refrigerant header and a sleeve open at one end to provide a freezer compartment, a shield for the front of said sleeve and header which extends rearwardly to conceal side portions of said sleeve and said header, baffles extending rearwardly of said shield sides for directing the flow of air about the evaporator and for concealing the header, and a source of light located within the enclosure formed by said shield, baffles, and portions of the header and sleeve, the header, sleeve, baffles, and shield serving as light-source concealing and light-diffusing means.

6. In combination a heat insulated compartment, an evaporator assembly suspended from a wall of said compartment, said evaporator comprising air flow directing means and air cooling means, and being provided with a pocket for receiving a source of light, said air flow directing means and air cooling means serving as light source concealing and light diffusing means.

JOHN C. BUCHANAN.